(12) United States Patent
Kalm

(10) Patent No.: US 10,875,719 B1
(45) Date of Patent: Dec. 29, 2020

(54) AUTOMATIC RAKE SORTATION

(71) Applicant: Amazon Technologies, Inc., Seattle, WA (US)

(72) Inventor: William Scott Kalm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/528,239

(22) Filed: Jul. 31, 2019

(51) Int. Cl.
*B65G 25/08* (2006.01)
*G06Q 10/08* (2012.01)
*B65G 17/12* (2006.01)
*B65G 47/76* (2006.01)

(52) U.S. Cl.
CPC .......... *B65G 25/08* (2013.01); *G06Q 10/087* (2013.01); *B65G 17/123* (2013.01); *B65G 47/766* (2013.01)

(58) Field of Classification Search
None
See application file for complete search history.

(56) References Cited

U.S. PATENT DOCUMENTS

| | | | | |
|---|---|---|---|---|
| 3,148,783 A | * | 9/1964 | Michaels | B07C 3/082 198/349.9 |
| 5,293,983 A | * | 3/1994 | Grapes | B07C 3/082 198/358 |
| 5,419,457 A | * | 5/1995 | Ross | B07C 3/008 198/357 |
| 5,535,874 A | * | 7/1996 | Ross | B07C 3/008 198/477.1 |
| 5,653,327 A | * | 8/1997 | Buday, Jr. | B65G 47/24 198/408 |
| 5,695,071 A | * | 12/1997 | Ross | B07C 3/008 198/367 |

* cited by examiner

*Primary Examiner* — William R Harp
(74) *Attorney, Agent, or Firm* — Kilpatrick Townsend & Stockton LLP

(57) ABSTRACT

An inventory management system can include a tray, a tine, and an actuator. The tray can have a body defining a slot extending along a length of the tray and through a front and a rear of the tray. The tine can be sized to fit through the slot. The actuator can move the tine into a deployed position in which the tine is arranged to pass through the slot and contact an item in the tray to cause the item to fall out of the rear of the tray as tray moves by the tine. The actuator may also be capable of moving the tine into a stowed position in which the tine is arranged to avoid extending through the slot as the tray moves by the tine.

20 Claims, 5 Drawing Sheets

AUTOMATIC RAKE SORTATION

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space and equipment, can result in lower throughput, unacceptably long response times, an ever-increasing backlog of unfinished tasks, and, in general, poor system performance. Speed, reliability, scalability, and other criteria may be pertinent areas for improvement, notwithstanding that a gain in one area may often yield a corresponding tradeoff in another.

BRIEF DESCRIPTION OF THE DRAWINGS

Various embodiments in accordance with the present disclosure will be described with reference to the drawings, in which.

DETAILED DESCRIPTION

Figure 1:
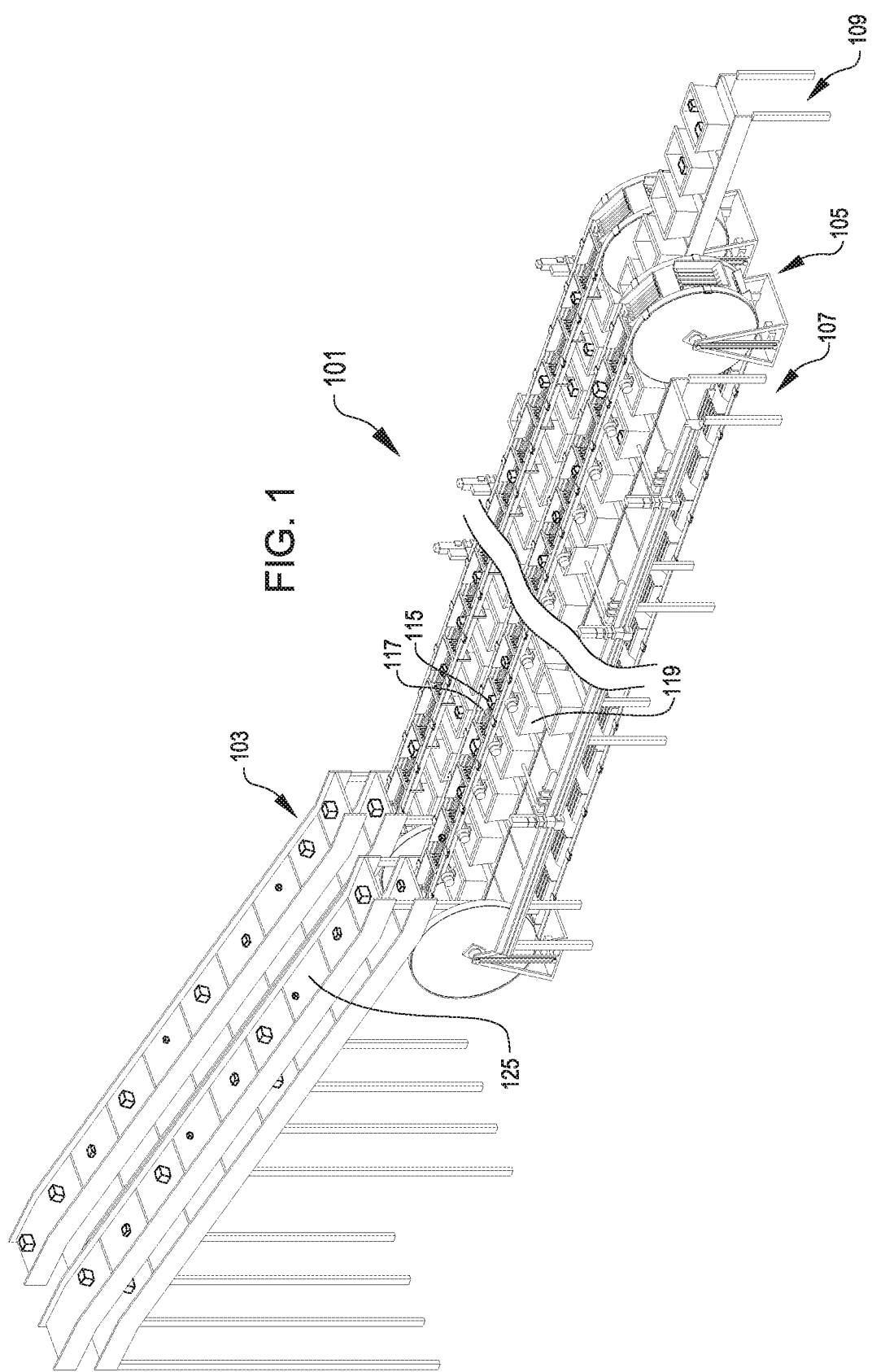
FIG. 1 illustrates an example of an inventory management system according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to inventory management systems, for example, which may find particular use in inventory systems that operate with a large variety of non-identical items. Such inventory management systems may utilize a series of trays that can be respectively automatically emptied to drop contents into pertinent totes or other relevant receptacles.

The unloading of the trays may be achieved in response to movement of the trays. For example, trays may be advanced by a series of belts over a series of stations. Each station may have a rake element. Most of the time, the rake may remain in a stowed state that allows trays to pass by (e.g., overhead) without interaction between the rake and the tray. However, when a tray is carrying an item that is to be transferred to a tote underneath the rake, the rake may rotate upward or otherwise deploy, e.g., just before that tray reaches the rake's position. As a result, the rake is positioned to align with slots that extend along the length of the tray. As the tray moves by the deployed rake, the slots in the tray receive tines of the rake. As the tray continues to travel, the tines pass along the slots (e.g., travelling through the length of the slots) and then exit through the rear of the slots (e.g., passing through slot ends at the back of the tray). During the movement of the tines along the slots, the tines extend up into the interior storage space of the tray. Any items in the tray get caught against the tines and pushed toward the back of the tray as the tray continues forward relative to the rake.

Upon reaching the rear of the tray, the item falls from the rear of the tray, e.g., through a gap defined between a rear of the initial tray and a front of a next tray in the series. A tote underneath can receive the item falling from the tray. Before the next tray in the series reaches the rake, the rake may actuate back to the stowed state, e.g., to avoid sliding through slots of the next tray and to prevent inadvertently unloading unintended items from the next tray. Selected items can be aggregated in the tote by subsequent actuation of the rake to the deployed state to unload other relevant trays as they pass by the tote. When the tote has all the items for a particular order or otherwise is completely loaded, the loaded tote may be moved out of the station and conveyed to another appropriate location. This may also make space for a fresh tote to be moved into the station for collection of another group of items to be individually dropped from different trays by action of the rake.

Referring now to the figures in which like reference numbers may denote like elements across several drawings, FIG. 1 shows an inventory management system 101 according to various embodiments. The inventory management system 101 shown in FIG. 1 includes a tray-loading system 103, a tray-based transfer system 105, a container supply system 107, and a container removal system 109. Components of the inventory management system 101 may include and/or interact with items 115, trays 117, and/or containers 119.

Generally, the tray-loading system 103 may load items 115 into trays 117 to facilitate subsequent processing within the inventory management system 101. The tray-based transfer system 105 can transfer items 115 from the trays 117 into respective containers 119. The container supply system 107 may supply or position such containers 119 for use with the tray-based transfer system 105. The container removal system 109 may remove containers 119 utilized with the tray-based transfer system 105, e.g., upon completion of transfer of items 115 from the trays 117 to the containers 119. The container removal system 109 may route containers 119 to other suitable locations within the inventory management system 101.

Various elements of the inventory management system 101 may utilize conveyors. Conveyors may correspond to any suitable structure for moving items 115, trays 117, containers 119, or other elements. Examples may include, but are not limited to, belts, rollers, chains, bands, robotic arms, or other conveyance devices.

The tray-loading system 103 may include any suitable structure for loading items 115 into trays 117. In FIG. 1, the tray-loading system 103 is shown with multiple item conveyors 125. In some embodiments, the item conveyors 125 may correspond to variable speed conveyors, e.g., which may account for movement of the trays 117 imparted by the tray-based transfer system 105. For example, the item conveyor 125 may speed up or slow down so that an item 115 moved by the tray-loading system 103 will land in or otherwise be loaded into one of the trays 117 (e.g., instead of dropping into a space or gap present between the trays 117). In some embodiments, the item conveyors 125 may be controlled so that particular items 115 will be received in predetermined trays 117. Although FIG. 1 illustrates item conveyors 125 with singulated items 115 that can be loaded individually into individual trays 117, in some embodiments, trays 117 may be loaded with more than one item 115 at a time, such as if an individual item conveyor 125 delivers multiple items at once, or if multiple item conveyors 125 provide individual items simultaneously, in close sequence, or otherwise in tandem.

In some embodiments, a correlation may be established to identify that an item 115 is located in or otherwise associated with a given tray 117. For example, optical sensors may be utilized to read bar codes, recognize objects, and/or otherwise identify or confirm that a particularly identified item 115 is within a particularly identified tray 117. Other options may also be utilized, including, but not limited to, arrangements utilizing radiofrequency identification (RFID).

Any suitable grouping of item conveyors 125 may be utilized. For example, in FIG. 1, although the tray-loading system 103 is shown having stacks of two item conveyors 125, one, two, or more than two could be utilized in stacks or other arrangements. In various embodiments, providing two or more may allow for reliable and/or efficient loading, such as if the tray-based transfer system 105 moves trays 117 at a greater rate than operation of an individual item conveyor 125. In various embodiments, use of stacked arrangements may enable increases in functionality without incurring an increase in overall footprint of utilized space.

Figure 2:
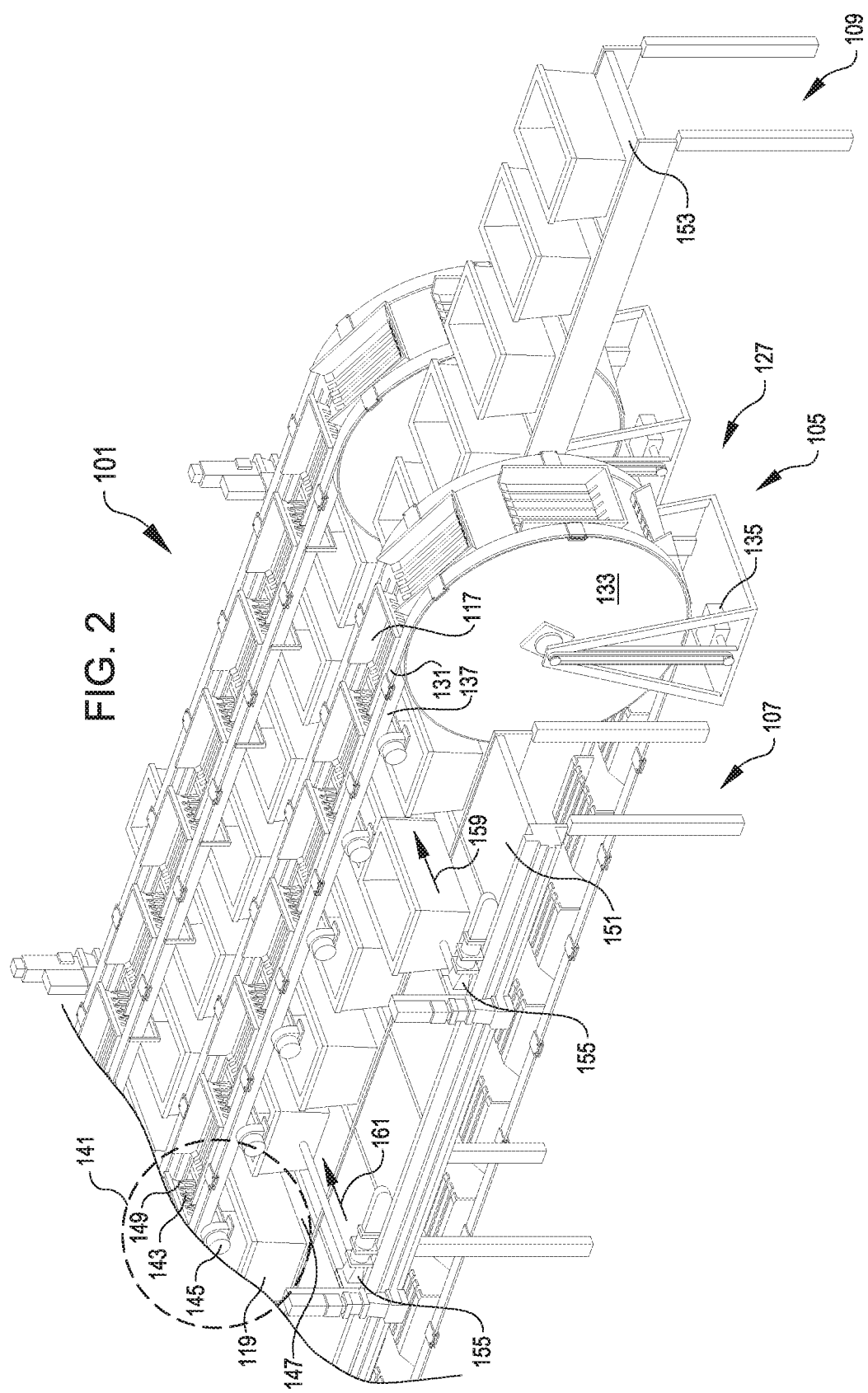
FIG. 2 illustrates a portion of the inventory management system of FIG. 1 with items removed from the view according to certain embodiments.

For ease of viewing other elements of the inventory management system 101, the tray-loading system 103 and items 115 are omitted from FIG. 2. However, various other features identified in FIG. 1 may be appreciated with reference to FIG. 2.

Referring now to FIG. 2, the tray-based transfer system 105 can include a tray conveyor 127. The tray conveyor 127 can include any structure for moving trays 117. In FIG. 2, the tray conveyor 127 includes a band 131, a sprocket 133, a motor 135, and a track 137.

The band 131 may be coupled with trays 117 to facilitate movement of the trays 117 in response to movement of the band 131. Suitable examples of the band 131 may include chains or belts. The band 131 may include geared surfaces, teeth, or other suitable structure to engage the sprocket 133. More generally, the band 131 may turn in response to turning of the sprocket 133. The motor 135 may impart angular motion or rotation to turn the sprocket 133, for example, in order to impart motion to the band 131 and coupled trays 117. The track 137 may provide a support structure along which the trays 117 can slide while being pulled or otherwise moved by the movement of the band 131.

The trays 117 can be moved in a forward direction along a travel path with respect to various stations 141. For simplicity, only one station 141 is individually identified in FIG. 2, although it may be appreciated that trays 117 may be moved relative to multiple stations 141.

The station 141 may be an unloading station or otherwise include suitable structure for unloading the trays 117. For example, in FIG. 2, the station 141 includes a rake 143, an actuator 145, and a receiving zone 147. The receiving zone 147 may be sized to receive a container 119, for example.

The rake 143 in FIG. 2 is shown having six tines 149, although any number of one or more tines 149 may be utilized. The tines 149 may interact with the tray 117 to facilitate unloading the tray, such as will be described in greater detail with respect to FIG. 3 and FIG. 4.

In some embodiments, the actuator 145 is mounted to the track 137. The actuator 145 may move the rake 143 among different positions. For example, the actuator 145 may move the rake 143 to a deployed position that may facilitate unloading the tray. The actuator 145 additionally may move the rake 143 to a stowed position that may allow a tray 117 to pass the station 141 without being unloaded in passage. Any suitable actuator 145 may be utilized. In some embodiments, the actuator may be a rotational actuator, although a linear actuator or other type of actuator could be used additionally or alternatively. In some embodiments, a rotational actuator may occupy less space than a linear or other type of actuator for accomplishing the same outcome and therefore may be more efficient from a space utilization perspective.

At the station 141, the tray 117 can be unloaded into the receiving zone 147, such as into a container 119. Any number of individual trays 117 can be individually unloaded into the container 119 to obtain a desired set of contents for the container 119. The container 119 may be removed from the station 141 and/or replenished or replaced, such as by respective operation of the container removal system 109 and/or the container supply system 107.

The container supply system 107 and/or the container removal system 109 can include or be associated with additional components to facilitate associated functions. For example, in FIG. 2, a container supply conveyor 151 and a container removal conveyor 153 may respectively supply and remove the container 119 relative to the station 141. A pusher 155 may be provided to facilitate movement of the container 119 relative to the station 141. Although the pusher 155 in FIG. 2 is generically depicted as an extending rod such as may be effectuated by a hydraulic or pneumatic assembly, any other suitable form of pusher 155 may be utilized, including, but not limited to, a chain that can transition between an engagement state in which the chain can push an item 115 and a storage state in which the chain can be coiled. In some embodiments, the pusher 155 may be movably mounted and capable of automated relocation to allow the pusher 155 to move among different stations 141 and thereby reduce a number of components for implementation.

The pusher 155 may push the container 119 into the receiving zone 147, for example, from the container supply conveyor 151 (e.g., as at arrow 159). Similarly, the pusher 155 may push the container 119 out of the receiving zone 147, for example, onto the container removal conveyor 153. In some embodiments, the pusher 155 may directly push a container 119 out of the receiving zone 147 (e.g., as at arrow 161). In some embodiments, the pusher 155 may indirectly push the container 119 from the receiving zone 147 (as at arrow 159), such as by directly pushing a first (e.g., inbound) container 119 from the container supply conveyor 151 so that the first container contacts and pushes a second (e.g., outbound) container 119 out of the station and onto the container removal conveyor 153.

Figure 3:
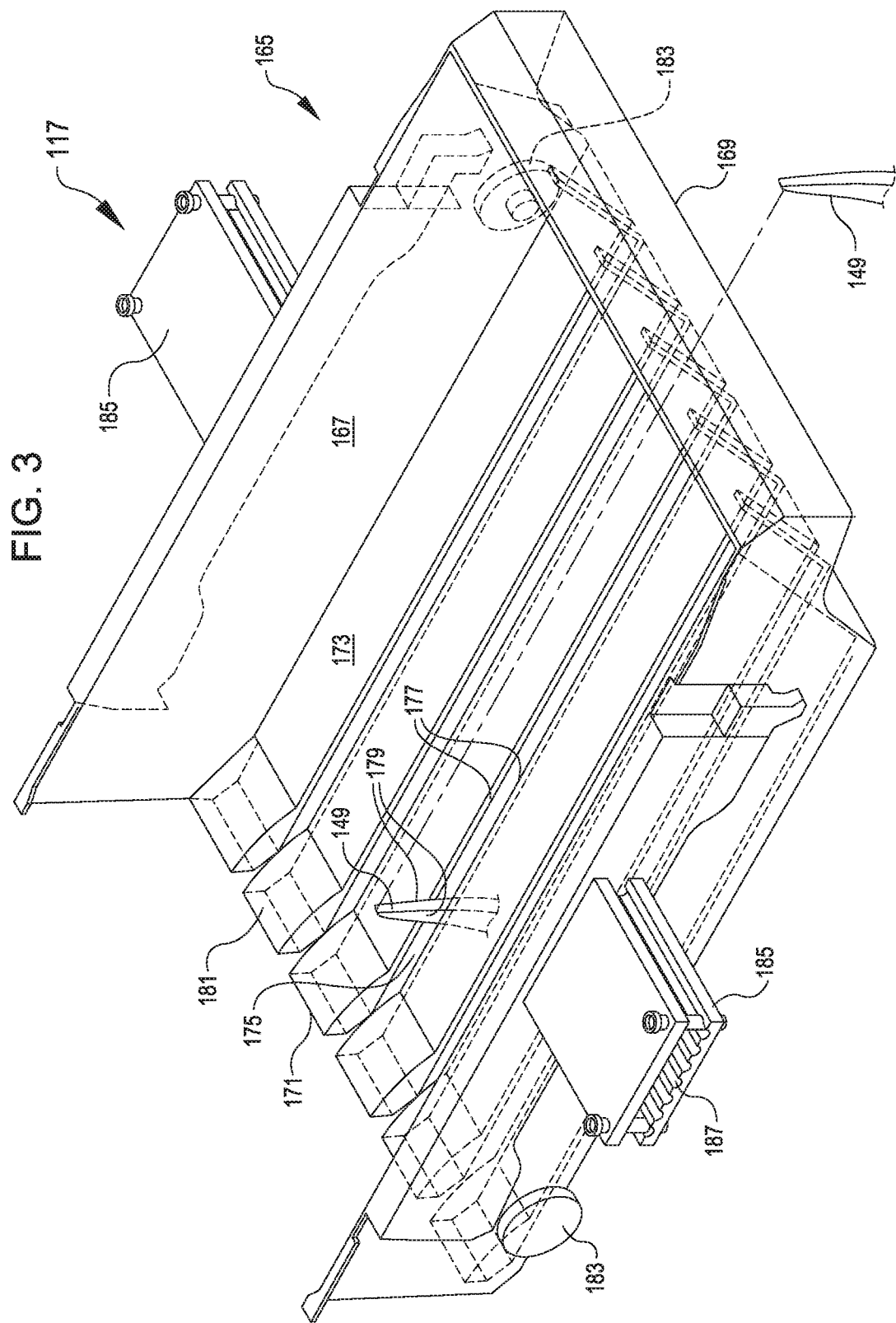
FIG. 3 illustrates a front perspective view of a tray that may be utilized in the inventory management system of FIG. 1 according to certain embodiments.

Referring to FIG. 3, an example of the tray 117 is shown in greater detail. The tray can include a tray body 165 that can define outer boundaries of an interior volume of the tray 117. For example, the body 165 may include sidewalls 167 (e.g., along lateral sides, a front 169, and/or a rear 171) and a bottom 173.

The tray 117 can include a slot 175. A total of six slots are shown in FIG. 3, although any suitable number may be utilized. In various embodiments, the number of slots 175 can match a number of tines 149 of rakes 143 at stations 141. The slots 175 may be parallel to one another, e.g., to facilitate simultaneous passage of multiple tines 149 through the tray 117.

The slot 175 can extend along a length of the tray 117. The slot 175 may extend through suitable portions of the tray 117, such as the front 169, the rear 171, and/or the bottom 173. In such areas, the slot 175 may correspond to a through-hole from the exterior of the tray 117 into the interior volume of the tray 117. For example, the slot 175 may extend from an underside of the tray 117 to an item-receiving surface within the tray 117. At the front 169 of the tray 117, the slot 175 may extend less than a full or entire height of the tray 117, e.g., which may retain structural integrity of the tray 117 and prevent the tray 117 from being fully separated into distinct or unconnected components.

The slot 175 and the tine 149 may be sized to allow the tine 149 to fit through the slot 175. For example, as the front 169 of the tray 117 moves toward the tine 149, the tine 149 may be received within the slot 175. The sides 177 of the slot 175 may be spaced apart a suitable distance such that the sides 179 of the tine 149 can fit between the sides 177 of the slot 175 as the tray 117 travels past the tine 149. In some embodiments, the slot 175 may extend less than an entire length of the tray 117, yet nevertheless be able to receive the tine 149. For example, if the slot 175 does not extend through the front 169 of the tray 117, the tine 149 may be actuatable to extend into the interior volume the tray 117 after the front 169 has passed the tine 149. Additionally or alternatively, if the slot 175 does not extend through the rear 171 of the tray 117, the tine 149 may be actuatable to retract out of the interior volume the tray 117 before the rear 171 has passed the tine 149 and/or the rear 171 may come into contact with the tine 149 to cause or facilitate retraction of the tine 149.

The rear 171 of the tray 117 can include a ramped surface 181. In use, the ramped surface 181 may retain items 115 within the tray 117 while items 115 are being carried in the tray 117 before interaction with a tine 149. When an item 115 in the tray 117 engages a tine 149 in use, the tine 149 can push the item 115 up the ramped surface 181 to drop the item 115 off the rear 171 of the tray 117.

The tray 117 can also include other features to facilitate movement of the tray 117. For example, in FIG. 3, the tray 117 includes wheels 183, e.g., that can roll along, slide on, or otherwise engage the track 137 to support the tray 117 during movement. In FIG. 3, the tray 117 also includes fasteners 185 for securing the tray 117 to the band 131. The fasteners 185 may be clamps, for example. In some embodiments, the fastener 185 may include suitable teeth or other contour features 187, which may mate up with or otherwise engage with similar features on the band 131 and/or sprocket 133 (e.g., such that engagement of the band 131 with the sprocket 133 is not impaired by the presence of the fasteners 185 coupled with the band 131).

Figure 4:
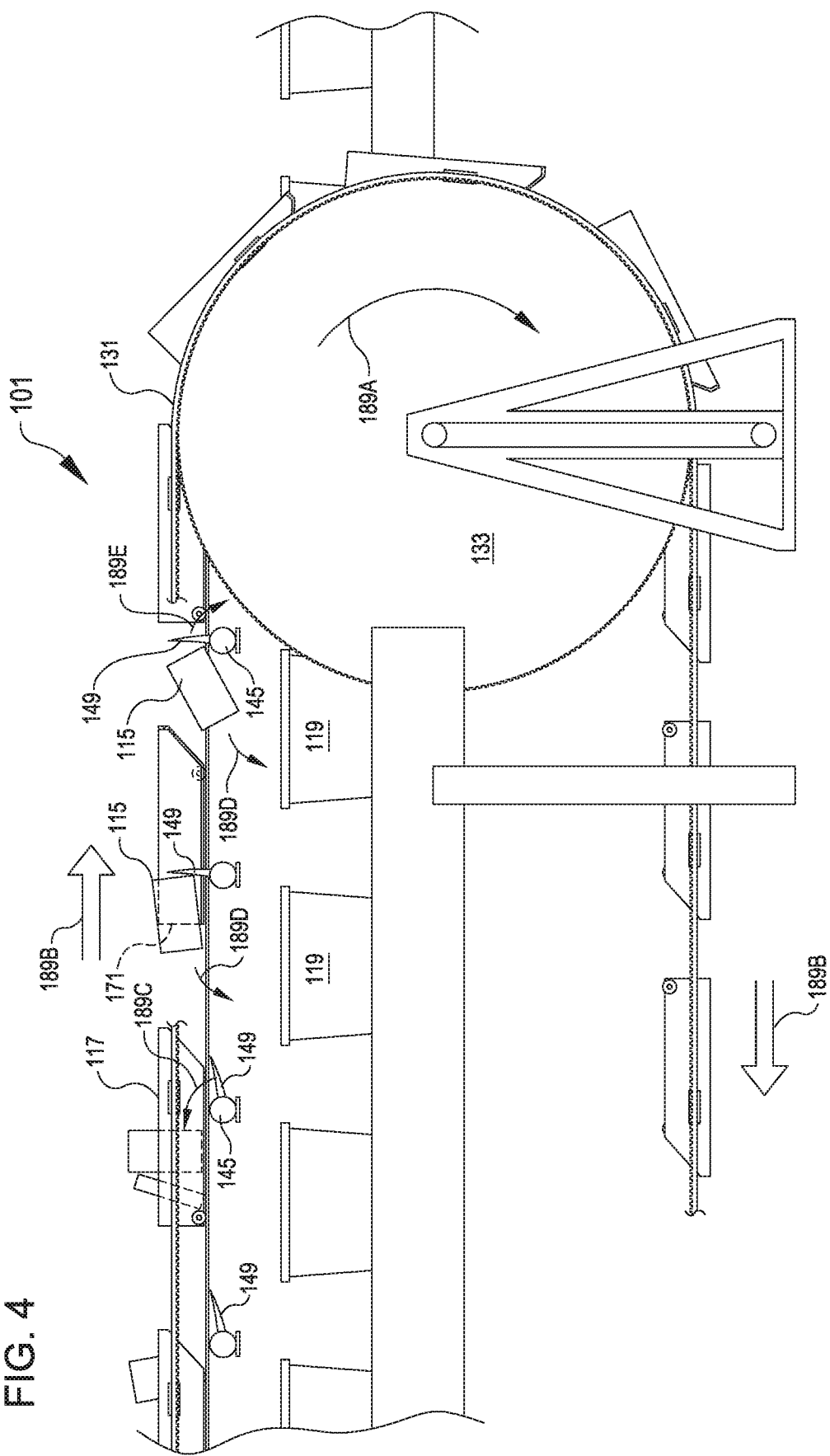
FIG. 4 illustrates a side view of elements of the inventory management system of FIG. 1 according to certain embodiments.

Referring to FIG. 4, an example sequence will be described. The sprocket 133 may rotate as at arrow 189A, which may impart motion through the band 131 to the trays 117. For example, as illustrated by arrows 189B, the trays 117 may travel toward a top of the sprocket 133, around a partial perimeter of the sprocket 133, and away from a bottom of the sprocket 133 (e.g., back toward a beginning of a loop).

During travel, the trays 117 may pass by respective tines 149. To unload a respective tray 117 during passage, the actuator 145 may actuate the tine 149 to a deployed position (e.g., as illustrated at arrow 189C). As illustrated at arrows 189D, in the deployed position, the tine 149 may engage an item 115 and cause the item 115 to move toward the rear 171 of the tray 117 such that the item 115 may drop into a corresponding container 119. As illustrated at arrow 189E, the actuator 145 may move the tine 149 away from the deployed position and toward a stowed position in which other trays 117 can pass by without removing respective items 115. As may be appreciated, from the stowed position, the actuator 145 can be selectively operated to return the tine 149 to the deployed position for unloading a subsequent target tray 117 in the sequence.

Although the arrows 189C and 189E show an actuation progression of rotating counterclockwise by approximately one quarter turn and rotating clockwise by approximately one quarter turn to move between deployed and stowed positions, other types of actuation are also possible. For example, in some embodiments, rotation may be by an amount other than one quarter turn. In some embodiments, an actuator 145 may cause a tine 149 to complete a full revolution to move from a stowed position, to a deployed position, and back to a stowed position. In some embodiments, the actuator 145 may implement a linear (or other non-rotational) movement between deployed and stowed positions.

In some embodiments, placement of respective elements may be different than shown in the figures. For example, although the actuator 145 and rakes 143 are shown beneath travel paths of respective trays 117, in some embodiments, unloading components may be positioned above a travel path. In an example of one such arrangement, the slot 175 may extend through a top of the tray 117 yet not extend full through an entire bottom of the tray 117 (e.g., at the front 169 or rear 171 of the tray 117) so as to avoid separating the tray into unconnected pieces. Nevertheless, positioning unloading elements below a travel path may avoid imparting height restrictions of items 115 that can be unloaded by tines 149.

In various embodiments, inventory management system 101 may be readily scalable and adjustable. For example, the fasteners 185 of the tray 117 may facilitate ready adjustment of a pitch or distance between respective trays 117 in a manner that may affect a size of gaps between successive trays 117 (e.g., which may facilitate appropriate adjustments to accommodate different speeds and/or sizes of items 115 in operation). As a further example, trays 117, stations 141, and or other elements may be readily added or removed to introduce components of different sizes and/or to extend or reduce a length occupied by the inventory management system 101. In some embodiments, modules of multiple stations 141 or other elements may be provided and allow ready insertion (e.g., between sprockets 133) to facilitate ease of adjustment of the scale of the inventory management system 101.

As may be appreciated with reference back to FIG. 1, in some embodiments, a single container removal system 109 on one side (e.g., a left side) may service one set of a tray-based transfer system 105 and a container supply system 107, and on another side (e.g., a right side) may service another set (e.g., which may reduce a number of parts in implementation). In some embodiments, multiple container removal systems 109 or other systems may be provided in duplicate, for example, for redundancy to improve reliability. Moreover, in various embodiments, elements of the inventory management system 101 may facilitate arranging multiple processing lines one above another, e.g., for facilitating efficient usage of volume in a space without increasing footprint.

Figure 5:
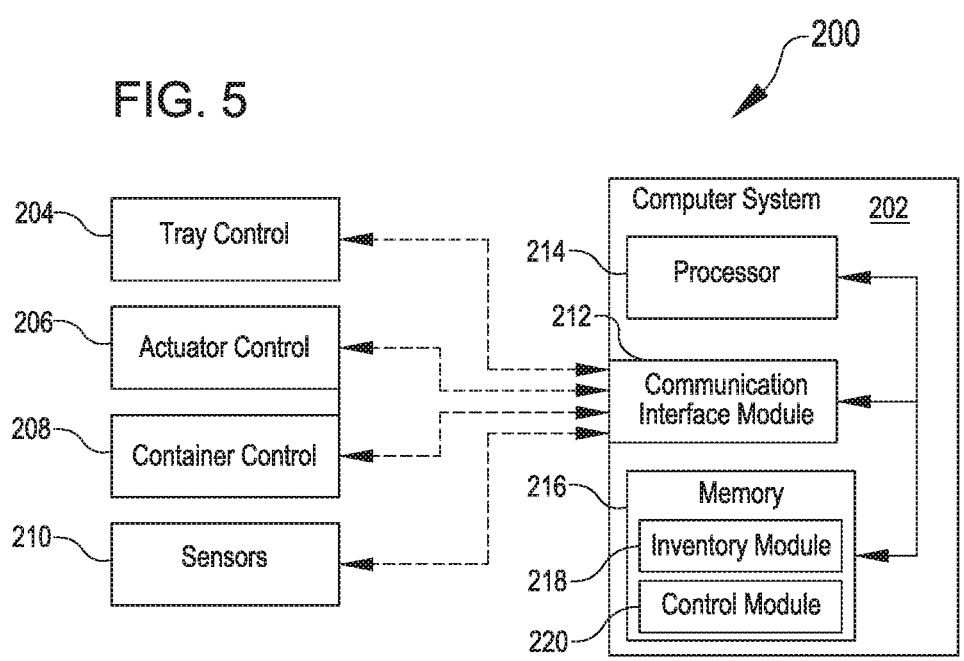
FIG. 5 is a block diagram illustrating components of an inventory management system according certain embodiments.

FIG. 5 is a block diagram illustrating components of an inventory management system 200 according to certain embodiments. The inventory management system 200 may be an example of the inventory management system 100, described elsewhere herein. As shown in FIG. 5, the inventory management system 200 includes a computer system 202, a tray control 204, an actuator control 206, a container control 208, and sensors 210. In general, the computer system 202 may function as a controller that controls other components of the inventory management system 200, for example, as described further below.

The tray control 204 may correspond to motors or other elements capable of adjusting how the trays 117 are provided. This may include elements that may affect how the trays 117 are loaded (e.g., the item conveyor 125 or other elements of the tray-loading system 103) and/or elements that may affect a speed or other characteristic of how the trays 117 are moved (e.g., the tray conveyor 127 or other elements of the tray-based transfer system 105). The actuator control 206 may correspond to the actuators 145 or other elements capable of adjusting the alignment of the rakes 143, tines 149, or other elements of the tray-based transfer system 105. The container control 208 may correspond to motors, actuators, or other elements capable of adjusting positioning or other functionality of the containers 119. This may include elements of the container supply system 107 and/or container removal system 109, for example. The sensors 210 may include optical sensors, pressure sensors, or any other sensors that may obtain information about items 110 or other elements of the inventory management system 100, which may include information about speed (e.g., of conveyors, trays, items, containers, actuators, rakes, tines, sprockets, etc.), actuator operation, alignment (e.g., of rakes or other elements), or any other conditions or state information about components of the inventory management system. The tray control 204, the actuator control 206, the container control 208, and the sensors 210 may function as appropriate inputs and/or outputs for control of the inventory management system 200 by the computer system 202.

The illustrated computer system 202 includes a communication interface module 212, a processor 214, a memory 216, an inventory module 218, and a control module 220. The computer system 15 may represent a single component, multiple components located at a central location within the inventory management system 200, or multiple components distributed throughout the inventory management system 200. In general, computer system 202 may include any appropriate combination of hardware and/or software suitable to provide the described functionality.

Processor 214 is operable to execute instructions associated with the functionality provided by computer system 202. Processor 214 may comprise one or more general purpose computers, dedicated microprocessors, or other processing devices capable of communicating electronic information. Examples of processor 214 include one or more application-specific integrated circuits (ASICs), field programmable gate arrays (FPGAs), digital signal processors (DSPs) and any other suitable specific or general purpose processors.

Memory 216 stores processor instructions, inventory requests, state information for the various components of inventory management system 200 and/or any other appropriate values, parameters, or information utilized by computer system 202 during operation. Memory 216 may represent any collection and arrangement of volatile or nonvolatile, local or remote devices suitable for storing data. Examples of memory 216 include, but are not limited to, random access memory (RAM) devices, read only memory (ROM) devices, magnetic storage devices, optical storage devices or any other suitable data storage devices.

Communication interface module 212 facilitates communication between computer system 202 and other components of inventory management system 200, including information and/or instructions conveyed between any of the tray control 204, actuator control 206, container control 208, sensors 210, inventory module 218, and control module 220. These communications may represent communication of any form appropriate based on the capabilities of computer system 202 and may include any suitable information. Depending on the configuration of computer system 202, communication interface module 212 may be responsible for facilitating either or both of wired and wireless communication between computer system 202 and the various components of inventory management system 200. In particular embodiments, computer system 202 may communicate using communication protocols such as 802.11, Bluetooth, or Infrared Data Association (IrDA) standards.

In general, the inventory module 218, the control module 220, and the communication interface module 212 may each represent any appropriate hardware and/or software suitable to provide the described functionality. In addition, as noted above, computer system 202 may, in particular embodiments, represent multiple different discrete components and any or all of the inventory module 218, the control module 220, and the communication interface module 212 may represent components physically separate from the remaining elements of computer system 202. Moreover, any two or more of the inventory module 218, the control module 220, and the communication interface module 212 may share common components. For example, in particular embodiments, the inventory module 218 and the control module 220 represent computer processes executing on processor 214 and communication interface module 212 comprises a wireless transmitter, a wireless receiver, and a related computer process executing on processor 214.

The inventory module 218 may determine conditions present in the inventory management system 200, track inventory requests, and/or determine objectives for the inventory management system 200. For example, the inventory module 218 may determine (e.g., based on an optical sensor 106) which items 115 are in which trays 117. The inventory module 218 may also determine targets (e.g., a target item within a particular tray, a target tray having a particular item, a target station or container designated to receive a target item from a target tray). The inventory module 218 may also determine the state of other elements within the inventory management system 200, such as a speed or orientation of an item 115, tray 117, container 119, rake 143, or actuator 145.

The control module 220 may control components within the inventory management system 200. For example, the control module 220 may send commands to the tray control 204, the actuator control 206, the container control 208, and the sensors 210 to control respective components of the inventory management system 200. In various embodiments, the control module 220 may control components based on information provided by the inventory module 218. For example, based on designated targets and relative location of those targets identified by the inventory module 218, the control module 220 may activate an actuator 145 to change a state of a rake 143 to cause unloading or avoid unloading at a particular station 141. The control module 220 may implement other changes based on the inventory module 218 determining other actions may be warranted to move other elements to suitable locations (such as adjusting a conveyor speed, adjusting a conveyor orientation, operating pushers 155, or controlling other elements of the inventory management system 200).

As an illustrative example, the inventory module 218 may determine, from the plurality of trays 117, a target tray 117 having a target item 115. The inventory module 218 may also determine, from the plurality of unloading stations 141, a target station 141 designated to receive the target item 115. This may include determining the container 119 that is designated to receive the item 115. Based on such determinations, the control module 220 may cause actuation of the actuator 145 at the target station 141 to move the rake 143 at the target station 141 into the deployed position for passing through the slot 175 of the target tray 117 and for engaging the target item 115 so that the target item 115 falls off the rear 171 of the target tray 117 through one of the gaps between the trays 117 into the container 119 of the receiving zone 147 at the target station 141.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system, comprising:
  a plurality of trays, each tray comprising a slot extending through a front, a bottom, and a rear of the tray;
  a tray conveyor coupled with the plurality of trays to drive the plurality of trays in a forward direction in an arrangement that includes gaps between the trays;
  a plurality of unloading stations, each comprising:
    a rake comprising at least one tine sized for extending through the slot;
    an actuator coupled with the rake for moving the rake between a deployed position in which the rake is aligned for passage through the slot and a stowed position in which the rake is arranged below the slot; and
    a receiving zone adapted to receive a container below the rake; and
  a controller comprising a processor and a non-transitory computer-readable medium comprising processor-executable instructions to cause the processor to:
    determine, from the plurality of trays, a target tray having a target item;
    determine, from the plurality of unloading stations, a target station designated to receive the target item;
    cause actuation of the actuator at the target station to move the rake at the target station into the deployed position, so that as the target tray moves through the target station, the rake passes through the slot of the target tray and engages the target item so that the target item falls off the rear of the target tray through one of the gaps between the trays into a container within the receiving zone of the target station; and
    cause actuation of the actuator at the target station to move the rake at the target station into the stowed position for passing beneath the slot of a tray subsequent to the target tray to avoid unloading.

2. The inventory management system of claim 1, wherein each tray at the rear further comprises a ramped surface angling up from an item-receiving surface of the tray.

3. The inventory management system of claim 1, further comprising a tray-loading system for loading items into the plurality of trays.

4. The inventory management system of claim 1, further comprising:
- a container supply system for supplying containers to the unloading stations; and
- a container removal system for removing containers from the unloading stations.

5. The inventory management system of claim 1, wherein the container within the receiving zone of the target station is a first container, the inventory management system further comprising a pusher configured to push an inbound container into contact with the first container to position the first container for removal and to introduce the inbound container into the receiving zone.

6. A tray for an inventory management system, the tray comprising:
- a body defining:
    - a bottom defining an item-receiving surface on one side and an underside opposite the item-receiving surface; and
    - a front;
    - a rear comprising a ramped surface angling up from the item-receiving surface of the tray;
    - a slot extending along a length of the tray and through the bottom from the underside to the item-receiving surface, the slot being sized to receive a tine actuatable between:
        - a deployed position in which the tine is arranged to pass through the slot and contact an item in the tray to cause the item to fall out of the rear of the tray as the tray moves by the tine; and
        - a stowed position in which the tine is arranged to avoid extending through the slot as the tray moves by the tine.

7. The tray of claim 6, wherein the slot extends less than an entire height of the tray.

8. The tray of claim 6, wherein the tray is associated with at least one of:
- a pusher configured to push an inbound container into contact with a first container located in a receiving zone below the tray to position the first container for removal and to introduce the inbound container into the receiving zone; or
- a controller comprising a processor and a non-transitory computer-readable medium comprising processor-executable instructions to cause the processor to cause actuation of an actuator to move the tine into the stowed position for passing beneath the slot of the tray to avoid unloading.

9. The tray of claim 6, wherein the slot comprises a plurality of parallel slots, wherein the tine comprises a first tine of a plurality of tines of a rake arranged for the plurality of tines to simultaneously extend through the plurality of parallel slots.

10. The tray of claim 6, further comprising a fastener adapted to couple the tray with a band drivable by
- a sprocket to impart motion for moving the tray relative to the tine.

11. The tray of claim 6, wherein the tray is engageable with a track arranged to support the tray during movement past the tine.

12. The tray of claim 11, wherein an actuator is mounted to the track and configured to move the tine between the deployed position and the stowed position.

13. The tray of claim 6, wherein the tray forms part of an assembly that also includes the tine.

14. The tray of claim 6, wherein the tray is associated with a controller comprising a processor and a non-transitory computer-readable medium comprising processor-executable instructions to cause the processor to:
- determine a container arranged below the tine is designated to receive the item; and
- cause actuation of an actuator to move the tine to the deployed position so that the tine passes through the slot and engages the item to cause the item to fall out of the rear of the tray and into the container.

15. An inventory management method, comprising:
- conveying a tray along a travel path toward an unloading station;
- actuating a tine at the unloading station to move the tine into a deployed position in which the tine extends into the travel path;
- conveying the tray through the unloading station such that the tine in the deployed position passes through a slot in the tray and engages an item in the tray to cause the item to fall off a rear of the tray into a first container in a receiving zone below the travel path; and
- pushing an inbound container into contact with the first container to position the first container for removal and to introduce the inbound container into the receiving zone.

16. The inventory management method of claim 15, wherein the tray at the rear comprises a ramped surface angling up from an item-receiving surface of the tray.

17. The inventory management method of claim 15, wherein the tray is a first tray, and wherein the method further comprises:
- actuating the tine at the unloading station to move into a stowed position in which the tine is removed from the travel path prior to passage of a second tray past the tine in response to operation of a controller comprising a processor and a non-transitory computer-readable medium comprising processor-executable instructions to cause the processor to actuate the tine.

18. The inventory management method of claim 15, wherein actuating the tine into the deployed position comprises rotating the tine.

19. The inventory management method of claim 15, wherein actuating the tine into the deployed position comprises rotating the tine in a first direction, and wherein the method further includes actuating the tine into a stowed position by rotating the tine in a second direction opposite the first direction.

20. The inventory management method of claim 15, wherein actuating the tine into the deployed position comprises moving the tine from beneath the travel path.

* * * * *